(12) United States Patent
 Amorese (10) Patent No.: US 12,059,674 B2
(45) Date of Patent: Aug. 13, 2024

(54) REAGENT STORAGE SYSTEM

(71) Applicant: Tecan Genomics, Inc., Redwood City, CA (US)

(72) Inventor: Douglas A. Amorese, Los Altos, CA (US)

(73) Assignee: Tecan Genomics, Inc., Redwood City, CA (US)

( * ) Notice: Subject to any disclaimer, the term of this patent is extended or adjusted under 35 U.S.C. 154(b) by 358 days.

(21) Appl. No.: 17/165,435

(22) Filed: Feb. 2, 2021

(65) Prior Publication Data
US 2021/0237048 A1 Aug. 5, 2021

Related U.S. Application Data

(60) Provisional application No. 62/969,364, filed on Feb. 3, 2020.

(51) Int. Cl.
*B01L 3/02* (2006.01)
*G01N 35/10* (2006.01)
(52) U.S. Cl.
CPC ........ *B01L 3/0217* (2013.01); *G01N 35/1002* (2013.01); *B01L 2200/0689* (2013.01); *B01L 2200/142* (2013.01); *B01L 2200/16* (2013.01)
(58) Field of Classification Search
CPC ........... B01L 3/0217; B01L 2200/0689; B01L 2200/142; B01L 2200/16; B01L 2200/0673; B01L 2200/141; B01L 3/0275; B01L 3/021; G01N 35/1002; G01N 35/10
See application file for complete search history.

(56) References Cited

U.S. PATENT DOCUMENTS

| | | | |
|---|---|---|---|
| 4,362,867 A | 12/1982 | Paddock |
| 4,458,066 A | 7/1984 | Caruthers et al. |
| 4,469,863 A | 9/1984 | Ts'o et al. |
| 4,582,877 A | 4/1986 | Fairchok et al. |
| 4,876,187 A | 10/1989 | Duck et al. |
| 4,925,065 A | 5/1990 | Golias |
| 4,935,357 A | 6/1990 | Szybalski |
| 4,942,124 A | 7/1990 | Church |
| 4,988,617 A | 1/1991 | Landegren et al. |
| 4,996,143 A | 2/1991 | Heller et al. |
| 5,011,769 A | 4/1991 | Duck et al. |
| 5,034,506 A | 7/1991 | Summerton et al. |
| 5,035,996 A | 7/1991 | Hartley |

(Continued)

FOREIGN PATENT DOCUMENTS

| | | |
|---|---|---|
| CA | 2444926 A1 | 11/2002 |
| CN | 1661102 A | 8/2005 |

(Continued)

OTHER PUBLICATIONS

Amos, 2000, DNA pooling in mutation detection with reference to sequence analysis, Am J Hum Genet 66:1689-1692.

(Continued)

*Primary Examiner* — Dennis White
(74) *Attorney, Agent, or Firm* — Brown Rudnick LLP; Adam M. Schoen (57) ABSTRACT

A small volume aqueous sample followed by an air gap and a droplet of oil can be drawn into a pipette tip as a means of storing and protecting the sample from the environment for extended periods of time.

20 Claims, 4 Drawing Sheets

(56) References Cited

U.S. PATENT DOCUMENTS

| | | |
|---|---|---|
| 5,043,272 A | 8/1991 | Hartley |
| 5,082,830 A | 1/1992 | Brakel et al. |
| 5,090,591 A | 2/1992 | Long |
| 5,130,238 A | 7/1992 | Malek et al. |
| 5,169,766 A | 12/1992 | Schuster et al. |
| 5,171,534 A | 12/1992 | Smith et al. |
| 5,194,370 A | 3/1993 | Berninger et al. |
| 5,216,141 A | 6/1993 | Benner |
| 5,234,809 A | 8/1993 | Boom et al. |
| 5,235,033 A | 8/1993 | Summerton et al. |
| 5,242,794 A | 9/1993 | Whiteley et al. |
| 5,312,757 A | 5/1994 | Matsuyama et al. |
| 5,384,242 A | 1/1995 | Oakes |
| 5,386,023 A | 1/1995 | Sanghvi et al. |
| 5,399,491 A | 3/1995 | Kacian et al. |
| 5,409,818 A | 4/1995 | Davey et al. |
| 5,418,149 A | 5/1995 | Gelfand et al. |
| 5,422,271 A | 6/1995 | Chen et al. |
| 5,427,929 A | 6/1995 | Richards et al. |
| 5,480,784 A | 1/1996 | Kacian et al. |
| 5,494,810 A | 2/1996 | Barany et al. |
| 5,508,169 A | 4/1996 | Deugau et al. |
| 5,508,178 A | 4/1996 | Rose et al. |
| 5,510,270 A | 4/1996 | Fodor et al. |
| 5,525,471 A | 6/1996 | Zeng |
| 5,545,522 A | 8/1996 | Van Gelder et al. |
| 5,554,516 A | 9/1996 | Kacian et al. |
| 5,554,517 A | 9/1996 | Davey et al. |
| 5,556,752 A | 9/1996 | Lockhart et al. |
| 5,565,340 A | 10/1996 | Chenchik et al. |
| 5,573,913 A | 11/1996 | Rosemeyer et al. |
| 5,578,832 A | 11/1996 | Trulson et al. |
| 5,589,339 A | 12/1996 | Hampson et al. |
| 5,602,240 A | 2/1997 | De Mesmaeker et al. |
| 5,637,684 A | 6/1997 | Cook et al. |
| 5,641,658 A | 6/1997 | Adams et al. |
| 5,644,048 A | 7/1997 | Yau |
| 5,665,549 A | 9/1997 | Pinkel et al. |
| 5,667,976 A | 9/1997 | Van Ness et al. |
| 5,667,979 A | 9/1997 | Berrens |
| 5,679,512 A | 10/1997 | Laney et al. |
| 5,681,726 A | 10/1997 | Huse et al. |
| 5,683,879 A | 11/1997 | Laney et al. |
| 5,688,648 A | 11/1997 | Mathies et al. |
| 5,705,628 A | 1/1998 | Hawkins |
| 5,708,154 A | 1/1998 | Smith et al. |
| 5,710,028 A | 1/1998 | Eyal et al. |
| 5,712,126 A | 1/1998 | Weissman et al. |
| 5,716,785 A | 2/1998 | Van Gelder et al. |
| 5,726,329 A | 3/1998 | Jones et al. |
| 5,750,341 A | 5/1998 | Macevicz |
| 5,759,822 A | 6/1998 | Chenchik et al. |
| 5,763,178 A | 6/1998 | Chirikjian et al. |
| 5,789,206 A | 8/1998 | Tavtigian et al. |
| 5,824,517 A | 10/1998 | Cleuziat et al. |
| 5,824,518 A | 10/1998 | Kacian et al. |
| 5,837,832 A | 11/1998 | Chee et al. |
| 5,876,976 A | 3/1999 | Richards et al. |
| 5,882,867 A | 3/1999 | Ullman et al. |
| 5,888,779 A | 3/1999 | Kacian et al. |
| 5,888,819 A | 3/1999 | Goelet et al. |
| 5,945,313 A | 8/1999 | Hartley et al. |
| 5,952,176 A | 9/1999 | McCarthy et al. |
| 5,958,681 A | 9/1999 | Wetmur et al. |
| 5,965,409 A | 10/1999 | Pardee et al. |
| 5,969,119 A | 10/1999 | Macevicz |
| 5,972,618 A | 10/1999 | Bloch |
| 6,004,744 A | 12/1999 | Goelet et al. |
| 6,004,745 A | 12/1999 | Arnold, Jr. et al. |
| 6,027,889 A | 2/2000 | Barany et al. |
| 6,027,923 A | 2/2000 | Wallace |
| 6,030,774 A | 2/2000 | Laney et al. |
| 6,037,152 A | 3/2000 | Richards et al. |
| 6,056,661 A | 5/2000 | Schmidt |
| 6,077,674 A | 6/2000 | Schleifer et al. |
| 6,087,103 A | 7/2000 | Burmer |
| 6,090,553 A | 7/2000 | Matson |
| 6,090,591 A | 7/2000 | Burg et al. |
| 6,107,023 A | 8/2000 | Reyes et al. |
| 6,110,709 A | 8/2000 | Ausubel et al. |
| 6,150,112 A | 11/2000 | Weissman et al. |
| 6,159,685 A | 12/2000 | Pinkel et al. |
| 6,160,105 A | 12/2000 | Cunningham et al. |
| 6,169,194 B1 | 1/2001 | Thompson et al. |
| 6,172,208 B1 | 1/2001 | Cook |
| 6,174,680 B1 | 1/2001 | Makrigiorgos |
| 6,180,338 B1 | 1/2001 | Adams |
| 6,190,865 B1 | 2/2001 | Jendrisak et al. |
| 6,194,211 B1 | 2/2001 | Richards et al. |
| 6,197,501 B1 | 3/2001 | Cremer et al. |
| 6,197,557 B1 | 3/2001 | Makarov et al. |
| 6,210,891 B1 | 4/2001 | Nyren et al. |
| 6,225,109 B1 | 5/2001 | Juncosa et al. |
| 6,225,451 B1 | 5/2001 | Ballinger et al. |
| 6,232,104 B1 | 5/2001 | Lishanski et al. |
| 6,251,639 B1 | 6/2001 | Kurn |
| 6,262,490 B1 | 7/2001 | Hsu et al. |
| 6,270,961 B1 | 8/2001 | Drmanac |
| 6,280,935 B1 | 8/2001 | Macevicz |
| 6,287,766 B1 | 9/2001 | Nolan et al. |
| 6,287,825 B1 | 9/2001 | Weissman et al. |
| 6,291,170 B1 | 9/2001 | Van Gelder et al. |
| 6,306,365 B1 | 10/2001 | Ruoslahti et al. |
| 6,306,597 B1 | 10/2001 | Macevicz |
| 6,309,843 B1 | 10/2001 | Timms |
| 6,326,142 B1 | 12/2001 | Royer |
| 6,335,167 B1 | 1/2002 | Pinkel et al. |
| 6,339,147 B1 | 1/2002 | Lukhtanov et al. |
| 6,440,705 B1 | 8/2002 | Stanton, Jr. et al. |
| 6,449,562 B1 | 9/2002 | Chandler et al. |
| 6,582,938 B1 | 6/2003 | Su et al. |
| 6,670,461 B1 | 12/2003 | Wengel et al. |
| 6,686,156 B2 | 2/2004 | Kurn |
| 6,692,918 B2 | 2/2004 | Kurn |
| 6,770,748 B2 | 8/2004 | Imanishi et al. |
| 6,777,180 B1 | 8/2004 | Fisher et al. |
| 6,794,499 B2 | 9/2004 | Wengel et al. |
| 6,815,164 B2 | 11/2004 | Kurn |
| 6,815,167 B2 | 11/2004 | Crothers et al. |
| 6,825,011 B1 | 11/2004 | Romantchikov |
| 6,833,246 B2 | 12/2004 | Balasubramanian |
| 6,849,404 B2 | 2/2005 | Park et al. |
| 6,858,413 B2 | 2/2005 | Kurn |
| 6,913,884 B2 | 7/2005 | Stuelpnagel et al. |
| 6,917,726 B2 | 7/2005 | Levene et al. |
| 6,924,104 B2 | 8/2005 | Weissman et al. |
| 6,946,251 B2 | 9/2005 | Kurn |
| 7,001,724 B1 | 2/2006 | Greenfield |
| 7,033,764 B2 | 4/2006 | Korlach et al. |
| 7,048,481 B2 | 5/2006 | Sugata et al. |
| 7,052,847 B2 | 5/2006 | Korlach et al. |
| 7,056,676 B2 | 6/2006 | Korlach et al. |
| 7,056,716 B2 | 6/2006 | Potter et al. |
| 7,060,441 B2 | 6/2006 | Bourget et al. |
| 7,094,536 B2 | 8/2006 | Kurn |
| 7,115,400 B1 | 10/2006 | Adessi et al. |
| 7,170,050 B2 | 1/2007 | Turner et al. |
| 7,175,982 B1 | 2/2007 | McCarthy et al. |
| 7,176,025 B2 | 2/2007 | Kurn et al. |
| 7,189,512 B2 | 3/2007 | Porat et al. |
| 7,211,390 B2 | 5/2007 | Rothberg et al. |
| 7,232,656 B2 | 6/2007 | Balasubramanian et al. |
| 7,244,559 B2 | 7/2007 | Rothberg et al. |
| 7,244,567 B2 | 7/2007 | Chen et al. |
| 7,264,929 B2 | 9/2007 | Rothberg et al. |
| 7,273,730 B2 | 9/2007 | Du Breuil Lastrucci |
| 7,276,720 B2 | 10/2007 | Ulmer |
| 7,294,461 B2 | 11/2007 | Kurn |
| 7,300,755 B1 | 11/2007 | Petersdorf et al. |
| 7,302,146 B2 | 11/2007 | Turner et al. |
| 7,313,308 B2 | 12/2007 | Turner et al. |
| 7,315,019 B2 | 1/2008 | Turner et al. |
| 7,323,305 B2 | 1/2008 | Leamon et al. |
| 7,335,762 B2 | 2/2008 | Rothberg et al. |

(56) References Cited

U.S. PATENT DOCUMENTS

| | | |
|---|---|---|
| 7,351,557 B2 | 4/2008 | Kurn |
| 7,354,717 B2 | 4/2008 | Kurn |
| 7,361,466 B2 | 4/2008 | Korlach et al. |
| 7,361,468 B2 | 4/2008 | Liu et al. |
| 7,402,386 B2 | 7/2008 | Kurn et al. |
| 7,405,281 B2 | 7/2008 | Xu et al. |
| 7,414,117 B2 | 8/2008 | Saito et al. |
| 7,416,844 B2 | 8/2008 | Korlach et al. |
| 7,462,452 B2 | 12/2008 | Williams et al. |
| 7,462,468 B1 | 12/2008 | Williams et al. |
| 7,476,503 B2 | 1/2009 | Turner et al. |
| 7,476,504 B2 | 1/2009 | Turner |
| 7,491,498 B2 | 2/2009 | Lapidus et al. |
| 7,501,245 B2 | 3/2009 | Quake et al. |
| 7,579,153 B2 | 8/2009 | Brenner et al. |
| 7,704,687 B2 | 4/2010 | Wang et al. |
| 7,741,463 B2 | 6/2010 | Gormley et al. |
| 7,771,934 B2 | 8/2010 | Kurn |
| 7,771,946 B2 | 8/2010 | Kurn |
| 7,803,550 B2 | 9/2010 | Makarov et al. |
| 7,846,666 B2 | 12/2010 | Kurn |
| 7,846,733 B2 | 12/2010 | Kurn |
| 7,867,703 B2 | 1/2011 | Sampson et al. |
| 7,939,258 B2 | 5/2011 | Kurn et al. |
| 7,948,015 B2 | 5/2011 | Rothberg et al. |
| 7,985,565 B2 | 7/2011 | Mayer et al. |
| 8,017,335 B2 | 9/2011 | Smith |
| 8,034,568 B2 | 10/2011 | Kurn et al. |
| 8,053,192 B2 | 11/2011 | Bignell et al. |
| 8,071,311 B2 | 12/2011 | Kurn |
| 8,143,001 B2 | 3/2012 | Kurn et al. |
| 8,209,130 B1 | 6/2012 | Kennedy et al. |
| 8,334,116 B2 | 12/2012 | Kurn |
| 8,465,950 B2 | 6/2013 | Kurn et al. |
| 8,492,095 B2 | 7/2013 | Kurn |
| 8,512,956 B2 | 8/2013 | Kurn |
| 8,551,709 B2 | 10/2013 | Kurn et al. |
| 8,852,867 B2 | 10/2014 | Kurn et al. |
| 8,999,677 B1 | 4/2015 | Soldatov et al. |
| 9,175,325 B2 | 11/2015 | Kurn et al. |
| 9,175,336 B2 | 11/2015 | Soldatov et al. |
| 9,181,582 B2 | 11/2015 | Kurn |
| 9,206,418 B2 | 12/2015 | Armour |
| 9,248,076 B2 | 2/2016 | Sullivan et al. |
| 9,546,399 B2 | 1/2017 | Amorese et al. |
| 9,650,628 B2 | 5/2017 | Amorese et al. |
| 9,702,004 B2 | 7/2017 | Van Eijk et al. |
| 9,745,627 B2 | 8/2017 | van Eijk et al. |
| 9,896,721 B2 | 2/2018 | Van Eijk et al. |
| 9,920,366 B2 | 3/2018 | Eltoukhy et al. |
| 10,036,012 B2 | 7/2018 | Amorese et al. |
| 10,102,337 B2 | 10/2018 | Scolnick et al. |
| 10,415,089 B2 | 9/2019 | Rava et al. |
| 10,457,995 B2 | 10/2019 | Talasaz |
| 10,570,451 B2 | 2/2020 | Salk et al. |
| 10,704,086 B2 | 7/2020 | Talasaz et al. |
| 10,738,364 B2 | 8/2020 | Talasaz |
| 2001/0000077 A1 | 3/2001 | Engelhardt et al. |
| 2001/0031739 A1 | 10/2001 | Dare |
| 2001/0034048 A1 | 10/2001 | Kurn |
| 2001/0041334 A1 | 11/2001 | Rashtchian et al. |
| 2002/0028447 A1 | 3/2002 | Li et al. |
| 2002/0058270 A1 | 5/2002 | Kurn |
| 2002/0115088 A1 | 8/2002 | Kurn |
| 2002/0150919 A1 | 10/2002 | Weismann et al. |
| 2002/0155451 A1 | 10/2002 | Makrigiorgos |
| 2002/0164628 A1 | 11/2002 | Kurn |
| 2002/0164634 A1 | 11/2002 | Patil et al. |
| 2002/0197611 A1 | 12/2002 | Chagovetz |
| 2002/0197639 A1 | 12/2002 | Shia et al. |
| 2003/0017591 A1 | 1/2003 | Kurn |
| 2003/0022207 A1 | 1/2003 | Balasubramanian et al. |
| 2003/0049861 A1 | 3/2003 | Woodward |
| 2003/0082543 A1 | 5/2003 | Su et al. |
| 2003/0087251 A1 | 5/2003 | Kurn |
| 2003/0119150 A1 | 6/2003 | Ankenbauer et al. |
| 2003/0143555 A1 | 7/2003 | Bourget et al. |
| 2003/0175780 A1 | 9/2003 | Jones |
| 2003/0180779 A1 | 9/2003 | Lofton-Day et al. |
| 2003/0186234 A1 | 10/2003 | Kurn |
| 2003/0207279 A1 | 11/2003 | Crothers et al. |
| 2003/0211616 A1 | 11/2003 | Leong |
| 2003/0213905 A1* | 11/2003 | Lennon ............... B01L 3/0262 250/288 |
| 2003/0215926 A1 | 11/2003 | Kurn et al. |
| 2003/0224439 A1 | 12/2003 | Lafferty et al. |
| 2003/0232348 A1 | 12/2003 | Jones et al. |
| 2004/0002371 A1 | 1/2004 | Paquin et al. |
| 2004/0005614 A1 | 1/2004 | Kurn et al. |
| 2004/0022689 A1 | 2/2004 | Wulf et al. |
| 2004/0023271 A1 | 2/2004 | Kurn et al. |
| 2004/0115815 A1 | 6/2004 | Li et al. |
| 2004/0137456 A1 | 7/2004 | Yokota et al. |
| 2004/0161742 A1 | 8/2004 | Dean et al. |
| 2004/0203019 A1 | 10/2004 | Kurn |
| 2004/0203025 A1 | 10/2004 | Kurn |
| 2004/0248153 A1 | 12/2004 | Dear et al. |
| 2005/0003441 A1 | 1/2005 | Kurn |
| 2005/0014192 A1 | 1/2005 | Kurn |
| 2005/0019793 A1 | 1/2005 | Kurn et al. |
| 2005/0059048 A1 | 3/2005 | Gunderson et al. |
| 2005/0064414 A1 | 3/2005 | Hanna |
| 2005/0064456 A1 | 3/2005 | Kurn |
| 2005/0123956 A1 | 6/2005 | Blume et al. |
| 2005/0136417 A1 | 6/2005 | Cole et al. |
| 2005/0142577 A1 | 6/2005 | Jones et al. |
| 2005/0191656 A1 | 9/2005 | Drmanac et al. |
| 2005/0191682 A1 | 9/2005 | Barone et al. |
| 2005/0208538 A1 | 9/2005 | Kurn et al. |
| 2006/0008824 A1 | 1/2006 | Ronaghi et al. |
| 2006/0014182 A1 | 1/2006 | Kurn |
| 2006/0024678 A1 | 2/2006 | Buzby |
| 2006/0024711 A1 | 2/2006 | Lapidus et al. |
| 2006/0035274 A1 | 2/2006 | Dong |
| 2006/0046251 A1 | 3/2006 | Sampson et al. |
| 2006/0051789 A1 | 3/2006 | Kazakov et al. |
| 2006/0068415 A1 | 3/2006 | Jones et al. |
| 2006/0134633 A1 | 6/2006 | Chen et al. |
| 2006/0216724 A1 | 9/2006 | Christians et al. |
| 2006/0263789 A1 | 11/2006 | Kincaid |
| 2006/0281082 A1 | 12/2006 | Zhu |
| 2006/0285430 A1 | 12/2006 | Seto |
| 2006/0286566 A1 | 12/2006 | Lapidus et al. |
| 2006/0292597 A1 | 12/2006 | Shapero et al. |
| 2007/0031857 A1 | 2/2007 | Makarov et al. |
| 2007/0134128 A1 | 6/2007 | Korlach |
| 2007/0141604 A1 | 6/2007 | Gormley et al. |
| 2007/0224607 A1 | 9/2007 | Morgan et al. |
| 2007/0224613 A1 | 9/2007 | Strathmann |
| 2007/0231823 A1 | 10/2007 | McKernan et al. |
| 2007/0238122 A1 | 10/2007 | Allbritton et al. |
| 2007/0263045 A1 | 11/2007 | Okazawa |
| 2008/0038727 A1 | 2/2008 | Spier |
| 2008/0087826 A1 | 4/2008 | Harris et al. |
| 2008/0103058 A1 | 5/2008 | Siddiqi |
| 2008/0131937 A1 | 6/2008 | Schroeder |
| 2008/0160580 A1 | 7/2008 | Adessi et al. |
| 2008/0176311 A1 | 7/2008 | Kurn |
| 2008/0182300 A1 | 7/2008 | Kurn |
| 2008/0194413 A1 | 8/2008 | Albert |
| 2008/0194416 A1 | 8/2008 | Chen |
| 2008/0206764 A1 | 8/2008 | Williams et al. |
| 2008/0213770 A1 | 9/2008 | Williams et al. |
| 2008/0217246 A1 | 9/2008 | Benn et al. |
| 2008/0241831 A1 | 10/2008 | Fan et al. |
| 2008/0242560 A1 | 10/2008 | Gunderson et al. |
| 2008/0286795 A1 | 11/2008 | Kawashima et al. |
| 2009/0011959 A1 | 1/2009 | Costa et al. |
| 2009/0024331 A1 | 1/2009 | Tomaney et al. |
| 2009/0026082 A1 | 1/2009 | Rothberg et al. |
| 2009/0029385 A1 | 1/2009 | Christians et al. |
| 2009/0036663 A1 | 2/2009 | Kurn |
| 2009/0061425 A1 | 3/2009 | Lo et al. |
| 2009/0061439 A1 | 3/2009 | Buzby |

(56) References Cited

U.S. PATENT DOCUMENTS

| | | |
|---|---|---|
| 2009/0068645 A1 | 3/2009 | Sibson |
| 2009/0068655 A1 | 3/2009 | Williams |
| 2009/0068709 A1 | 3/2009 | Kurn et al. |
| 2009/0105081 A1 | 4/2009 | Rodesch et al. |
| 2009/0117573 A1 | 5/2009 | Fu et al. |
| 2009/0117621 A1 | 5/2009 | Boutell et al. |
| 2009/0123923 A1 | 5/2009 | Yamamoto et al. |
| 2009/0124514 A1 | 5/2009 | Fu et al. |
| 2009/0127589 A1 | 5/2009 | Rothberg et al. |
| 2009/0130721 A1 | 5/2009 | Kurn et al. |
| 2009/0203085 A1 | 8/2009 | Kurn et al. |
| 2009/0203531 A1 | 8/2009 | Kurn |
| 2009/0233802 A1 | 9/2009 | Bignell et al. |
| 2009/0233804 A1 | 9/2009 | Kurn et al. |
| 2009/0239232 A1 | 9/2009 | Kurn |
| 2009/0275486 A1 | 11/2009 | Kurn et al. |
| 2009/0280538 A1 | 11/2009 | Patel et al. |
| 2009/0298075 A1 | 12/2009 | Travers et al. |
| 2010/0015666 A1 | 1/2010 | Brenner et al. |
| 2010/0021973 A1 | 1/2010 | Makarov et al. |
| 2010/0022403 A1 | 1/2010 | Kurn et al. |
| 2010/0029511 A1 | 2/2010 | Raymond et al. |
| 2010/0069250 A1 | 3/2010 | White, III et al. |
| 2010/0081174 A1 | 4/2010 | Dunn |
| 2010/0105052 A1 | 4/2010 | Drmanac et al. |
| 2010/0113296 A1 | 5/2010 | Myerson |
| 2010/0129879 A1 | 5/2010 | Ach et al. |
| 2010/0137143 A1 | 6/2010 | Rothberg et al. |
| 2010/0159559 A1 | 6/2010 | Kurn et al. |
| 2010/0167954 A1 | 7/2010 | Earnshaw et al. |
| 2010/0173394 A1 | 7/2010 | Colston, Jr. et al. |
| 2010/0203597 A1 | 8/2010 | Chen et al. |
| 2010/0267043 A1 | 10/2010 | Braverman et al. |
| 2010/0273219 A1 | 10/2010 | May et al. |
| 2010/0311066 A1 | 12/2010 | Kurn |
| 2010/0323348 A1 | 12/2010 | Hamady et al. |
| 2011/0009276 A1 | 1/2011 | Vermaas et al. |
| 2011/0015096 A1 | 1/2011 | Chiu |
| 2011/0039732 A1 | 2/2011 | Raymond et al. |
| 2011/0104785 A1 | 5/2011 | Vaidyanathan et al. |
| 2011/0105364 A1 | 5/2011 | Kurn |
| 2011/0129827 A1 | 6/2011 | Causey et al. |
| 2011/0186466 A1 | 8/2011 | Kurowski et al. |
| 2011/0189679 A1 | 8/2011 | Kurn et al. |
| 2011/0224105 A1 | 9/2011 | Kurn et al. |
| 2011/0288780 A1 | 11/2011 | Rabinowitz et al. |
| 2011/0294132 A1 | 12/2011 | Kurn |
| 2011/0319290 A1 | 12/2011 | Raymond et al. |
| 2012/0003657 A1 | 1/2012 | Myllykangas et al. |
| 2012/0028310 A1 | 2/2012 | Kurn et al. |
| 2012/0045797 A1 | 2/2012 | Kurn et al. |
| 2012/0071331 A1 | 3/2012 | Casbon et al. |
| 2012/0074925 A1 | 3/2012 | Oliver |
| 2012/0102054 A1 | 4/2012 | Popescu et al. |
| 2012/0107811 A1 | 5/2012 | Kelso et al. |
| 2012/0122701 A1 | 5/2012 | Ryan et al. |
| 2012/0149068 A1 | 6/2012 | Kurn |
| 2012/0156728 A1 | 6/2012 | Li et al. |
| 2012/0157322 A1 | 6/2012 | Myllykangas et al. |
| 2012/0190587 A1 | 7/2012 | Kurn et al. |
| 2012/0208705 A1 | 8/2012 | Steemers et al. |
| 2012/0220479 A1 | 8/2012 | Ericsson et al. |
| 2012/0220483 A1 | 8/2012 | Kurn et al. |
| 2012/0220494 A1 | 8/2012 | Samuels et al. |
| 2012/0237943 A1 | 9/2012 | Soldatov et al. |
| 2012/0238738 A1 | 9/2012 | Hendrickson |
| 2012/0245041 A1 | 9/2012 | Brenner et al. |
| 2012/0252682 A1 | 10/2012 | Zhou et al. |
| 2012/0270212 A1 | 10/2012 | Rabinowitz et al. |
| 2012/0283145 A1 | 11/2012 | Wang |
| 2012/0289426 A1 | 11/2012 | Roos et al. |
| 2012/0309002 A1 | 12/2012 | Link |
| 2012/0328487 A1 | 12/2012 | Saito et al. |
| 2013/0005585 A1 | 1/2013 | Anderson et al. |
| 2013/0059738 A1 | 3/2013 | Leamon et al. |
| 2013/0072390 A1 | 3/2013 | Wang et al. |
| 2013/0137582 A1 | 5/2013 | Ong et al. |
| 2013/0231253 A1 | 9/2013 | Amorese et al. |
| 2014/0031240 A1 | 1/2014 | Behlke et al. |
| 2014/0038188 A1 | 2/2014 | Kurn |
| 2014/0038236 A1 | 2/2014 | Kurn et al. |
| 2014/0051585 A1 | 2/2014 | Prosen et al. |
| 2014/0065692 A1 | 3/2014 | Kurn et al. |
| 2014/0186827 A1 | 7/2014 | Pieprzyk et al. |
| 2014/0274729 A1 | 9/2014 | Kurn et al. |
| 2014/0274731 A1 | 9/2014 | Raymond et al. |
| 2014/0274738 A1 | 9/2014 | Amorese et al. |
| 2014/0274741 A1 | 9/2014 | Hunter et al. |
| 2014/0303000 A1 | 10/2014 | Armour |
| 2014/0378345 A1 | 12/2014 | Hindson et al. |
| 2015/0004600 A1 | 1/2015 | Wang et al. |
| 2015/0011396 A1 | 1/2015 | Schroeder et al. |
| 2015/0017635 A1 | 1/2015 | Myllykangas et al. |
| 2015/0037790 A1 | 2/2015 | Fox et al. |
| 2015/0101595 A1 | 4/2015 | Hancock et al. |
| 2015/0111208 A1 | 4/2015 | Umbarger et al. |
| 2015/0133319 A1 | 5/2015 | Fu et al. |
| 2015/0190802 A1 | 7/2015 | Oppenheimer et al. |
| 2015/0218620 A1 | 8/2015 | Behlke et al. |
| 2015/0284769 A1 | 10/2015 | Schroeder |
| 2015/0299767 A1 | 10/2015 | Armour et al. |
| 2015/0299784 A1 | 10/2015 | Fan et al. |
| 2015/0299812 A1 | 10/2015 | Talasaz |
| 2016/0016140 A1 | 1/2016 | Jovanovich et al. |
| 2016/0068889 A1 | 3/2016 | Gole et al. |
| 2016/0122756 A1 | 5/2016 | Armour |
| 2016/0130576 A1 | 5/2016 | Armour |
| 2016/0153039 A1 | 6/2016 | Amorese et al. |
| 2016/0203259 A1 | 7/2016 | Scolnick et al. |
| 2016/0220994 A1 | 8/2016 | Wright |
| 2016/0251711 A1 | 9/2016 | Amorese et al. |
| 2016/0265042 A1 | 9/2016 | Schroeder et al. |
| 2016/0275240 A1 | 9/2016 | Huelga et al. |
| 2016/0296930 A1 | 10/2016 | Matear et al. |
| 2017/0356053 A1 | 12/2017 | Otto et al. |
| 2018/0127817 A1 | 5/2018 | Borchert et al. |
| 2018/0216174 A1 | 8/2018 | Shum et al. |
| 2018/0346977 A1 | 12/2018 | Alt et al. |

FOREIGN PATENT DOCUMENTS

| | | |
|---|---|---|
| CN | 101565746 A | 10/2009 |
| CN | 105890722 A | 8/2016 |
| EP | 0365627 B1 | 12/1993 |
| EP | 0329822 B1 | 6/1994 |
| EP | 0667393 A2 | 8/1995 |
| EP | 1071811 B1 | 3/2002 |
| EP | 0843735 B1 | 7/2002 |
| EP | 1362788 A2 | 11/2003 |
| EP | 2186563 A2 | 5/2010 |
| EP | 2272976 A1 | 1/2011 |
| EP | 2322612 A1 | 5/2011 |
| EP | 2451973 A1 | 5/2012 |
| EP | 2511381 A1 | 10/2012 |
| EP | 2538228 A2 | 12/2012 |
| EP | 2599879 A1 | 6/2013 |
| EP | 1929039 B2 | 11/2013 |
| JP | 2015511819 A | 4/2015 |
| WO | 89/09284 A1 | 10/1989 |
| WO | 92/07951 A1 | 5/1992 |
| WO | 93/18052 A1 | 9/1993 |
| WO | 94/16090 A1 | 7/1994 |
| WO | 96/40998 A1 | 12/1996 |
| WO | 97/12061 A1 | 4/1997 |
| WO | 97/25416 A2 | 7/1997 |
| WO | 98/06736 A1 | 2/1998 |
| WO | 98/38296 A1 | 9/1998 |
| WO | 98/044151 A1 | 10/1998 |
| WO | 99/10540 A1 | 3/1999 |
| WO | 99/11819 A1 | 3/1999 |
| WO | 99/42618 A1 | 8/1999 |
| WO | 00/08208 A2 | 2/2000 |
| WO | 2000/09756 A1 | 2/2000 |
| WO | 00/018957 A1 | 4/2000 |

(56) References Cited

FOREIGN PATENT DOCUMENTS

| | | |
|---|---|---|
| WO | 00/39345 A1 | 7/2000 |
| WO | 2000/043531 A2 | 7/2000 |
| WO | 00/52191 A1 | 9/2000 |
| WO | 2000/55364 A2 | 9/2000 |
| WO | 00/70039 A1 | 11/2000 |
| WO | 01/20035 A2 | 3/2001 |
| WO | 01/23613 A1 | 4/2001 |
| WO | 01/46464 A1 | 6/2001 |
| WO | 01/57248 A2 | 8/2001 |
| WO | 01/64952 A2 | 9/2001 |
| WO | 02/00938 A2 | 1/2002 |
| WO | 02/28876 A2 | 4/2002 |
| WO | 02/29117 A2 | 4/2002 |
| WO | 02/36821 A2 | 5/2002 |
| WO | 02/48402 A2 | 6/2002 |
| WO | 02/060318 A2 | 8/2002 |
| WO | 02/072772 A2 | 9/2002 |
| WO | 02/072773 A2 | 9/2002 |
| WO | 02/081753 A1 | 10/2002 |
| WO | 02/090584 A2 | 11/2002 |
| WO | 03/004690 A2 | 1/2003 |
| WO | 2003/002736 A2 | 1/2003 |
| WO | 2003/012118 A1 | 2/2003 |
| WO | 03/022438 A1 | 3/2003 |
| WO | 03/027259 A2 | 4/2003 |
| WO | 03/078645 A2 | 9/2003 |
| WO | 03/083435 A2 | 10/2003 |
| WO | 03/106642 A2 | 12/2003 |
| WO | 04/011665 A2 | 2/2004 |
| WO | 2004/070007 A2 | 8/2004 |
| WO | 2004/092418 A2 | 10/2004 |
| WO | 2005/003375 A2 | 1/2005 |
| WO | 2005/003381 A1 | 1/2005 |
| WO | 2005/038427 A2 | 4/2005 |
| WO | 2005/065321 A2 | 7/2005 |
| WO | 2006/081222 A1 | 8/2006 |
| WO | 2006/086668 A2 | 8/2006 |
| WO | 2006/137733 A1 | 12/2006 |
| WO | 2007/018601 A1 | 2/2007 |
| WO | 2007/019444 A2 | 2/2007 |
| WO | 2007/030759 A2 | 3/2007 |
| WO | 2007/037678 A2 | 4/2007 |
| WO | 2007/052006 A1 | 5/2007 |
| WO | 2007/057652 A1 | 5/2007 |
| WO | 2007/073165 A1 | 6/2007 |
| WO | 2007/136717 A1 | 11/2007 |
| WO | 2008/005459 A2 | 1/2008 |
| WO | 2008/015396 A2 | 2/2008 |
| WO | 2008/033442 A2 | 3/2008 |
| WO | 2008/093098 A2 | 8/2008 |
| WO | 2008/115185 A2 | 9/2008 |
| WO | 2008150432 A1 | 12/2008 |
| WO | 2009/053039 A1 | 4/2009 |
| WO | 2009/102878 A2 | 8/2009 |
| WO | 2009/102896 A2 | 8/2009 |
| WO | 2009/112844 A1 | 9/2009 |
| WO | 2009/117698 A2 | 9/2009 |
| WO | 2009/120372 A2 | 10/2009 |
| WO | 2009/120374 A2 | 10/2009 |
| WO | 2010/003153 A2 | 1/2010 |
| WO | 2010/030683 A1 | 3/2010 |
| WO | 2010/039991 A2 | 4/2010 |
| WO | 2010/063711 A1 | 6/2010 |
| WO | 2010/064893 A1 | 6/2010 |
| WO | 2010/085715 A1 | 7/2010 |
| WO | 2010/091246 A2 | 8/2010 |
| WO | 2010/115154 A1 | 10/2010 |
| WO | 2010/129937 A2 | 11/2010 |
| WO | 2011/003630 A1 | 1/2011 |
| WO | 2011/009941 A1 | 1/2011 |
| WO | 2011/019964 A1 | 2/2011 |
| WO | 2011/032053 A1 | 3/2011 |
| WO | 2011032040 A1 | 3/2011 |
| WO | 2011/053987 A1 | 5/2011 |
| WO | 2011/151777 A1 | 12/2011 |
| WO | 2011/156529 A2 | 12/2011 |
| WO | 2012/013932 A1 | 2/2012 |
| WO | 2012/061832 A1 | 5/2012 |
| WO | 2012/054873 A3 | 8/2012 |
| WO | 2012/103154 A1 | 8/2012 |
| WO | 2013/059740 A1 | 4/2013 |
| WO | 2013/059746 A1 | 4/2013 |
| WO | 2013/112923 A1 | 8/2013 |
| WO | 2013/130674 A1 | 9/2013 |
| WO | 2013/130512 A3 | 10/2013 |
| WO | 2013/177220 A1 | 11/2013 |
| WO | 2013/190441 A2 | 12/2013 |
| WO | 2013/191775 A2 | 12/2013 |
| WO | 2014/028778 A1 | 2/2014 |
| WO | 2014/039556 A1 | 3/2014 |
| WO | 2014/082032 A1 | 5/2014 |
| WO | 2013/138510 A9 | 7/2014 |
| WO | 2014/144092 A1 | 9/2014 |
| WO | 2014/150931 A1 | 9/2014 |
| WO | 2015/031691 A1 | 3/2015 |
| WO | 2015/073711 A1 | 5/2015 |
| WO | 2015/104302 A1 | 7/2015 |
| WO | 2015/131107 A1 | 9/2015 |
| WO | 2018/102783 A1 | 6/2018 |
| WO | WO-2018213682 A1 * | 11/2018 ............ B01L 3/0275 |
| WO | 2019/079724 A1 | 4/2019 |

OTHER PUBLICATIONS

Applied Biosystems, 2010, BigDye Terminator v3.1 Cycle Sequencing Kit Protocol (72 pages).
Baldwin, 2009, Multilocus sequence typing of Cronobacter sakazakii and Cronobacter malonaticus reveals stable clonal structures with clinical significance which do not correlate with biotypes, BMC Microbiol 9(223):1-9.
Bao, 2014, Review of current methods, applications and data management for the bioinformatics analysis of whole exome sequencing, Cancer Informatics 13:S2, pp. 67-82.
Bellos, 2014, cnvCapSeq: detecting copy number variation in long-range targeted resequencing data, Nucleic Acids Res 42(20):e158.
Benson, 2013, Genbank, Nucl Acids Res 41:D36-D42.
Blomquist, 2013, Targeted RNA-Sequencing with Competitive Multiplex-PCR Amplicon Libraries, PLOS ONE 8(11):e79120.
Bodi, 2013, Comparison of commercially available target enrichment methods for next-generation sequencing, J Biomolecular Tech 24:73-86.
Borodina, 2011, A strand-specific library preparation protocol for RNA sequencing methods, Meth Enzymol 500:79-98.
Browning, 2011, Haplotype phasing: existing methods and new developments, Nature Rev Gen, 12(10):703-714.
Callow, 2004, Selective DNA amplification from complex genomes using universal double-sided adaptors, Nucl Acids Res 32(2):e21/1-6.
Church, 1988, Multiplexed DNA sequencing, Science 240:185-188.
Colbert, 2001, High-throughput screening for induced point mutations, Plant Physiol 126:480-484.
Collard, 2005, An introduction to markers, quantitative trait loci (QTL) mapping and marker-assisted selection for crop Improvements: the basic concepts Euphytica 142:169-196.
Diao, 2015, Building highly-optimized, low latency pipelines for genomic data analysis, 7th Bienniel Conference on Innovative Data Systems Research (CIDR'15), Jan. 4-7, Asilomar, California, USA, 12 pages.
Eminaga, 2013, Quantification of microRNA Expression with Next-Generation Sequencing, Unit 4.17 in Current Protocols in Molecular Biology, Wiley, New York, NY (14 pages).
Faircloth, 2012, Not all sequence tags are created equal: Designing and validating sequence identification tags robust to indels, PLoSONE 7(8):e42543.
Fakhrai-Rad, 2002, Pyroseqeuncing: An accurate detection platform for single nucleotide polymorphisms, Human Mutation 19:479-485.
Frederico, 1990, A sensitive genetic assay for the detection of cytosine deamination: determination of rate constants and the activation energy, Biochemistry 29(10):2532-2537.

(56) References Cited

OTHER PUBLICATIONS

Fromer, 2014, Using XHMM Software to Detect Copy Number Variation in Whole-Exome Sequencing Data, Curr Protoc Hum Genet 81(7.23):1-21.
Fu, 2014, Molecular indexing enables quantitative targeted RNA sequencing and reveals poor efficiencies in standard library preparations, PNAS 111(5):1891-1896 and Supporting Information, 8 pages.
Genereux, 2008, Errors in the bisulfite conversion of DNA: modulating inappropriate and failed conversion frequencies, Nucl Acids Res 36(22):e150.
Gonzales-Beltran, 2015, From Peer-REviewed to Peer-reproduced in scholary publishing: the complementary roles of data models and workflows in Bioinformatics, PLOS ONE 10(7):127612, 23 pages.
Grothues, 1993, PCR amplification of megabase DNA with tagged random primers (T-PCR), Nucl Acids Res 21:1321-1322.
Hajibabaei, 2005, Critical factors for assembling a high volume of DNA barcodes, Phil Trans R Soc B 360:1959-1967.
Head, 2015, Library construction for next-generation sequencing: Overviews and challenges, Biotechniques 56(2):61.
Illumina, 2011, TruSeq RNA and DNA Sample Preparation Kits v2, 1-15 Illumina, dated 27 Apr. 27, 2011 (4 pages).
Ion Total RNA-Seq Kit v2, User Guide, 2012, Life Technologies (82 pages).
Jiang, 2015, CODEX: a normalization and copy number variation detection method for whole exome sequencing, Nucleic Acids Res 43(6):e39.
John, 2011, Detection of Viral microRNA with S1 Nuclease Protection Assay, Chapter 10 in Antiviral RNAi, van Rig, Ed. Springer.
Kalari et al., MAP-Rseq: Mayo analysis pipeline for RNA sequencing, BMC bioinformatics 2014, vol. 15, 224, 13 pages and Supplemental Information.
Karczewki et al., 2014, STORMSeq: an open-source user-friendly pipleline for processing personal genomics data in the cloud.PLOS ONE 9(1):e84860, 5 pages.
Kim et al., 2011, TopHat-Fusion: an algorithm for discovery of novel fusion transcripts, Cancer Discovery, vol. 12:R72, 15 pages.
Krumm, 2012, Copy Number variation detection and genotyping from exome sequence data, Genome Res 22(8):1525-1532.
Lai, 2004, Characterization of the maize endosperm transcriptome and its comparison to the rice genome, Genome Res14:1932-1937.
Langmead, 2009, Ultrafast and memory-efficient alignment of short DNA sequences to the human genome, Genome Biol 10:R25.
Levin, 2010, Comprehensive comparative analysis of strand-specific RNA sequencing methods, Nat Methods 7(9):709-715.
Li, 2012, CONTRA: copy number analysis for targeted resequencing, Bioinformatics 28(10):1307-1313.
Li, 2014, Bioinformatics pipelines for targeted resequencing and whole-exome sequencing of human and mouse genomes: a virtual appliance approach for instant deployment, PLOS ONE, 9(4):e95217 and Supplemental Information, 11 pages.
Liang, 2014, Copy number variation sequencing for comprehensive diagnosis of chromosome disease syndromes, The Journal of Molecular Diagnostics, 16(5), plus Supplemental Information, 15 pages.
Lindstrom, 2004, Pyrosequencing for detection of Lamivudine-resistant Hepatitis B virus, J Clin Microb 42(10):4788-4795.
Liu, 2008, Sequence space coverage, entropy of genomes and the potential to detect non-human DNA in human samples, BMC Genomics 9(509):1-17.
Ma, 2015, Quantitative Analysis of Copy Number Variants Based on Real-Time LightCycler PCR, Curr Protoc Hum Genet 80:7.21.1-7.23.8.
Machine translation generated Jun. 18, 2021, of JP 2015511819 A (400 pages).
Machine translation generated on Mar. 7, 2018, of CN 105890722 by website of European Patent Office (4 pages).
Margulies, 2005, Genorne sequencing in open microfabricated high density picoliter reactors, Nature 437(7057):376-380.
Mauk, 2018, Simple Approaches to Minimally-Instrumented, Microfluidic-Based Point-of-Care Nucleic Acid Amplification Tests, Biosensors 8(1):e17.
McCloskey, 2007, Encoding PCR products with batch-stamps and barcodes, Biochem Genet 45:761-767.
Merriman, 2012, Progress in Ion Torrent semiconductor chip based sequencing, Electrophoresis, 35(23):3397-3417.
Miner, 2004, Molecular barcodes detect redundancy and contamination in hairpin-bisulfite PCR, Nucl Acids Res 32(17):e135, 4 pages.
Morlan, 2012, Selective depletion of rRNA enables whole transcriptome profiling of archival fixed tissue, PLoSOne 7(8):e42882.
Myers, 2013, Protocol for Creating Multiplexed miRNA Libraries for Use in Illumina Sequencing, Myers lab microRNA-seq Protocol, Hudson Alpha Institute for Biotechnology web site, dated May 2, 2013, (15 pages).
Mühlberger, 2011, Compputational Analysis Workflows for Omics Data Interpretation, In: Mayer B. (eds) Bioinformatics for Omics Data, Methods in Molecular Biology (Methods and Protocols), vol. 719, pp. 379-397, Chapter 17, Humana Press.
NuGEN, 2014, User Guide Ovation Target Enrichment System, NuGEN Technologies Inc., San Carlos, CA (45 pages).
NuGEN, 2016, Ovation RNA-Seq User Guide, NuGEN Technologies, Inc., San Carlos, CA (42 pages).
Plagnol, 2012, A robust model for read count data in exome sequencing experiments and implications for copy number variant calling, Bioinformatics 28(21):2747-2754.
Qiu, 2003, DNA sequence-based "bar-codes" for tracking the origins of expressed sequence tags from a maize cDNA library constructed using multiple mRNA sources, Plant Physiol 133:475-481.
Querfurth, 2012, Creation and application of immortalized bait libraries for targeted enrichment and next-generation sequencing, Biotechniques 52(6):375-380.
Ronaghi, 2001, Pyrosequencing sheds light on DNA sequencing, Genome Res 11:3-11.
Rothberg, 2011, An integrated semiconductor device enabling non-optical genome sequencing, Nature 475(7356):348-352.
Sambrook, 2005, Mapping RNA with nuclease S1, Nat Meth 2:397-398.
Sathirapongsasuti, 2011, Exome sequencing-based copy-number variation and loss of heterozygosity detection: ExomeCNV, Bioinformatics 27(19):2648-2654.
Schiemer, 2011, Illumina TruSeq Adapters Demystified, Tufts University Core Facility XP055357867 (5 pages).
Shapero, 2001, SNP Genotyping by multiplexed solid-phase amplification and fluorescent minisequencing, Genome Res 11:1926-1934.
Shendure, 2005, Accurate multiplex polony sequencing of an evolved bacterial genome, Science 309:1728.
Shiroguchi, 2012, Digital RNA sequencing minimizes sequence dependent bias and amplification noise with optimized single-molecule barcodes, PNAS, 109(4):1347-1352 and Supplemental Information, 22 pages.
Smith, 2010, Highly-multiplexed barcode sequencing: an efficient method for parallel analysis of pooled samples, Nucleic Acids Research, 38(13):e142, 7 pages.
Soni, 2007, Progress toward ultrafast DNA sequencing using solid-state nanopores, Clin Chem 53(11):1996-2001.
Sood, 2006, Methods for reverse genetic screening in zebrafish by resequencing and Tilling, Methods 39:220-227.
Staroscik, 2004, Calculator for determining the number of copies of a template, URI Genomics, webpage archive dated Apr. 6, 2017 (1 page), Retrieved from the internet on Mar. 7, 2018, from <https://web.archive.org/web/20170406174850/http://cels.uri.edu/gsc/cndna.html>.
Steffens, 2017, A versatile and low-cost open source pipetting robot for automation of toxicological and ecotoxicological bioassays, PLoS One 12(6):e0179636.
Stratagene, 1998, Gene characterization kits, Stratagene Catalog, p. 39 (2 pages).
Tewhey, 2009, Micrdroplet-based PCR enrichment for large-scall targeted sequencing, Nat Biotech 27(11):1025-1031.

(56) References Cited

OTHER PUBLICATIONS

The Ovation Ultralow System V2 User guide, part No. 0344, 0344NB, file name M01379_v5_User_Guide_Ovation_Ultralow_Library_Systems_V2_(Part_No._ 0344)_2215.pdf, available from nugen. com from NuGEN Technologies Inc., San Carlos, CA (30 pages).

Till, 2003, Large-scale discovery of induced point mutations with high-throughput Tilling, Genome Res 13:524-530.

Torri, 2012, Next generation sequence analysis and computational genomics using graphical pipeline workflows, Genes, vol. 3, pp. 545-575.

Trapnell, 2010, Transcript assembly and quantification by RNA-Seq reveals unannotated transcripts and isoform switching during cell differentiation, Nat Biotech 28:511-515.

Trapnell, 2013, Differential analysis of gene regulation at transcript resolution with RNA-seq, Nat Biotech 31:46-53.

Truseq Nano DNA Library Prep guide, file name truseq-nano-dna-library-prep-guide-15041110-d.pdf, available from support.illumina.com, Illumina, Inc., San Diego, CA (40 pages).

Tucker, 2009, Massively parallel sequencing: the next big thing in genetic medicine, Am J Human Genet 85:142-154.

Unemo, 2004, Molecular typing of Neisseria gonorrhoeae isolates by pyrosequencing of highly polymorphic segments of the porB gene, J Clin Microb 42(7):2926-2934.

Van der Auwera, 2013, From FastQ data to high confidence variant calls, the Genome Analysis Toolkit Best Practices Pipeline, Current Protocols in Bioinformatics 11.10.1-11.10.33, WileyOnlineLibrary.com, 33 pages.

Vigal, 2002, A review on SNP and other types of molecular markers and their use in animal genetics, Genet Sel Evol 34:275-305.

Wagle, 2012, High-Throughput detection of actionable genomic alterations in clinical tumor samples by targeted massively parallel sequencing, Cancer Discovery, 2(1):82-93.

Walker, 1992, Strand displacement amplification—an isothermal, in vitro DNA amplification technique, Nucl Acids Res 20(7):1691-1696.

Westin 2000, Anchored multiplex amplification on a microelectronic chip array, Nat Biotech 18:199-204.

Wienholds, 2004, Target-selected gene inactivation in zebrafish, Meth Cell Biol 77:69-90.

Wolford, 2000, High-throughput SNP detection by using DNA pooling and denaturing high performance liquid chromatography (DHPLC), Hum Genet 107:483-487.

Xi, 2011, Copy number variation detection in whole-genome sequencing data using the Bayesian information criterion, PNAS 108(46):e1128-e1136.

Xu, 2012, FastUniq: A fast de novo duplicates removal tool for paired short reads, PLoSOne 7(12):e52249.

\* cited by examiner

REAGENT STORAGE SYSTEM

TECHNICAL FIELD

The disclosure relates to reagent and reaction storage.

BACKGROUND

Many analytical techniques require the use of precise, and sometimes small, amounts of reagent. In molecular biology for example, reactions are often conducted in microfluidic environments and several reagents must be combined in precise amounts and ratios to ensure an acceptable result. Furthermore, many reactions are sensitive to contamination and reagents must therefore be stored and manipulated in a controlled environment. Various attempts to automate reagent delivery can remove some human error but come with their own shortcomings.

Existing methods of automated reagent delivery include robotic fluid handlers and microfluidic devices. The advent of automated reaction processing in computer-controlled systems allows for round-the-clock experimentation. Unfortunately, with automated reactions being completed late at night and on weekends, they may be left unattended for hours or days at a time until a researcher returns to the laboratory. While the samples await retrieval, reaction volume may be lost to evaporation or may experience other environmental degradation that can impact results and ruin the experiments.

Controlling evaporation and environmental degradation of these samples is critical. Sealing systems exist to apply a seal to the vessel containing the finished sample but these sealing systems add cost and complexity to the liquid handler and can interfere with access to the sample being processed. Small volumes with large surface areas, even in sealed enclosures can be subject to evaporation over time. When these samples are in open containers, evaporation takes place even more rapidly depending on the operating environment (relative humidity and airflow).

SUMMARY

Systems and methods of the invention provide sample storage in commonly-used liquid reaction processing components (e.g., pipette tips) that avoid evaporation and environmental degradation of reaction volumes therein. By containing reaction volumes in pipette tips, processing can be simplified and expensive consumables can be conserved, saving time and money. In order to store a liquid sample, a small amount of another fluid can be drawn into the end of the pipette to separate the sample from the external environment. Due to the function of the pipette, one end of the tip is already sealed against the pipette itself while liquid is drawn in through an opposite open end. By drawing a sealing fluid into the open end, the sample volume can then be fully sealed within the pipette tip, avoiding evaporation and other forms of environmental degradation. The sealing fluid may be immiscible with the sample in order to prevent mixing. For example, where the sample is aqueous, the sealing fluid may be an oil such as mineral oil. The sealing fluid may be inert or otherwise non-reactive with the sample in order to avoid any impact on the reaction in the stored sample. A pipette tip may be a disposable tip made of polymer (e.g. polypropylene, polypropylene with graphite) for manual pipettes or for automated systems. A pipette tip may also be a cannula made of stainless steel coated with fluoropolymer or not for automated processing systems.

In certain embodiments, a small amount of air can be drawn into the pipette tip before the sealing fluid to provide a separation between the sealing fluid and the sample volume. The resulting air gap between the sample and the sealing fluid can prevent the sealing fluid from migrating above or trading positions with the sample volume which would effectively break the seal. In some embodiments, the sealing fluid may have a greater density than the sample and the pipette may be stored in an upright manner such that the tip opening is the lowest point and the more dense sealing fluid remains between the sample and the opening. Systems and methods of the invention may be used whenever reagents or reaction volumes might be stored, such as upon completion of a reaction or at a stopping point in the reaction. In certain embodiments, incubations or other longer-running steps in an experiment may be performed in a pipette tip sealed according to methods of the invention.

Methods of the invention may be performed manually or in automated fluid-handling machines. In certain embodiments, automated fluid handling devices may be controlled by a computer including a non-transitory memory and a processor. The computer may be operable to perform the steps of the method to store a sample at the end of a reaction. The computer may initiate the sealing steps of the methods described herein upon receipt of a user command to pause the reaction. Such a command may be received via a user interface. In certain embodiments, the computer may be programmed to, upon completion of a reaction or while awaiting additional user input, automatically seal the pipette tip until the user is ready to resume the reaction or retrieve the sample. Automated machines may include a reservoir of sealing fluid in order to perform the sealing steps.

Aspects of the invention include sample storage methods. The methods may include providing a sample in a pipette tip attached to a pipette and drawing air though an opening in the pipette tip using the pipette to create an air gap between the sample and the opening. Methods may then include drawing a fluid into the opening using the pipette to seal the opening and prevent evaporation of the sample.

The fluid may be immiscible with the sample. In various embodiments, the sample can be aqueous and the fluid may be an oil. The fluid may comprise mineral oil. In certain embodiments the fluid may be a wax and methods may include storing the pipette tip at a temperature below the melting point of the wax and heating the wax above its melting point in order to remove the sample from storage in the tip. In certain embodiments, the air gap can separate the fluid from the sample. Methods may include storing the sample in the pipette tip without evaporation for at least one hour, at least 6 hours, at least 12 hours, at least 24 hours, at least 2 days, or at least 3 days.

In some embodiments, the pipette may be part of an automated processing system. The automated processing system can include a non-transitory memory in communication with a processor operable to perform steps of a reaction using the pipette. The automated processing system may be operable to perform the drawing steps upon completion of the reaction. The automated processing system can be operable to perform the drawing steps upon receipt of a user input pausing the reaction.

In certain aspects, systems of the invention may include an automated processing system including a computer and pipette and operable to perform the methods described herein.

DETAILED DESCRIPTION

Systems and methods of the invention provide streamlined storage of reagents and samples during or after reactions. By storing said volumes in pipette tips otherwise present and used in reaction processing, the use of complicated sealing systems and excessive consumables can be avoided. Because the samples are sealed within the pipette tip, problems resulting from the evaporation or environmental degradation of the sample can be avoided. Accordingly, in automated processes that reach stopping points during weekends or other off-hours, samples can be safely stored within pipette tips by the system for hours or days until a researcher or other user can attend to them.

The pipette tip avoids much of the evaporation and degradation issues arising from environmental exposure due to the relatively small cross-sectional area exposed to the environment through the pipette tip's opening. Even so, systems and methods of the invention include drawing a sealing fluid into the pipette tip opening to form a buffer between the sample or reaction volume and the outside environment.

Figure 1:
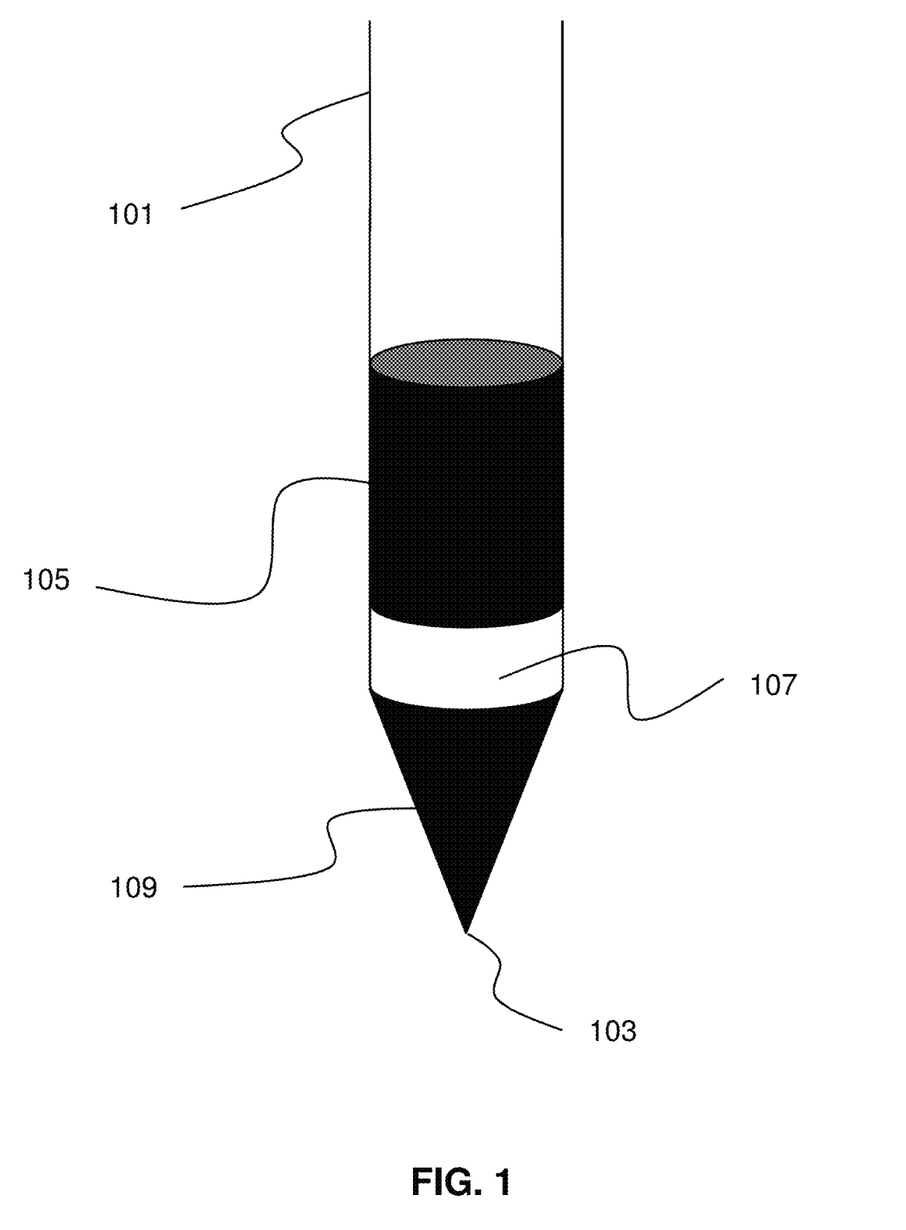
FIG. 1 shows pipette-tip storage according to certain embodiments.

FIG. 1 shows a sample volume 105 being stored in a pipette tip 101 according to certain embodiments. The pipette tip 101 comprises an opening 103 through which fluid can be drawn into the pipette tip 101 in response to changes in pressure or volume within the pipette (not shown). The pipette tip 101 can be a disposable tip including a larger opening which is sealed to a pipette (not shown) such as those commercially available from Tecan Trading, Ltd. (Switzerland). In certain embodiments the pipette tip 101 may be integrated into a pipette comprising, for example, a deformable bulb used to draw fluid into and expel fluid from the tip 101. Pipettes and pipette tips 101 may be part of an automated fluid handling system such as the Fluent and Freedom EVO platform available from Tecan Trading, Ltd. (Switzerland).

When storage of the sample volume 105 is desired, the pipette can be used to draw air into the pipette tip 101 to form an air gap 107 before drawing a sealing fluid 109 into the pipette tip 101. The sealing fluid 109 can be immiscible with the sample volume 105 to prevent mixing should they come in contact. The air gap 107 can help prevent any such contact and help maintain the positions of the sample volume 105 and the sealing fluid 109 relative to the opening 103 thereby maintaining a sealed environment for the sample volume to prevent evaporation or environmental degradation.

In preferred embodiments, the sample volume 105 is aqueous, such as a DNA library that has been prepared for sequencing. In such embodiments, the sealing fluid 109 may be an oil such as mineral oil. Exemplary mineral oils include J6292, BP26291, and 0121-1 available from ThermoFisher (Waltham, MA) and M5904 BioReagent and M8662 PCR Reagent available from Sigma-Aldrich (St. Louis, MO). In preferred embodiments, the sealing fluid 109 may be a low-volatility fluid that does not evaporate at room temperature and is accordingly odorless.

In some embodiments, the sealing fluid 109 may be a wax that is drawn into the pipette tip 101 in a liquid state. The pipette tip 101 can then be stored at a temperature below the melting point of the wax and the sealing wax can be heated above its melting point in order to remove the sample volume 105. The sealing fluid 109 is preferably inert or non-reactive with the sample volume 105 such that any incidental contact between the two will not affect reaction results. In order to promote the desired positioning of the sealing fluid 109 between the sample volume 105 and the opening 103, the relative densities of the two fluids and the storage position of the pipette tip 101 may be manipulated. For example, the pipette tip 101 may be stored with the opening 103 facing downward and the sealing fluid 109 may be selected to have a greater density than the sample volume 105.

Figure 2:
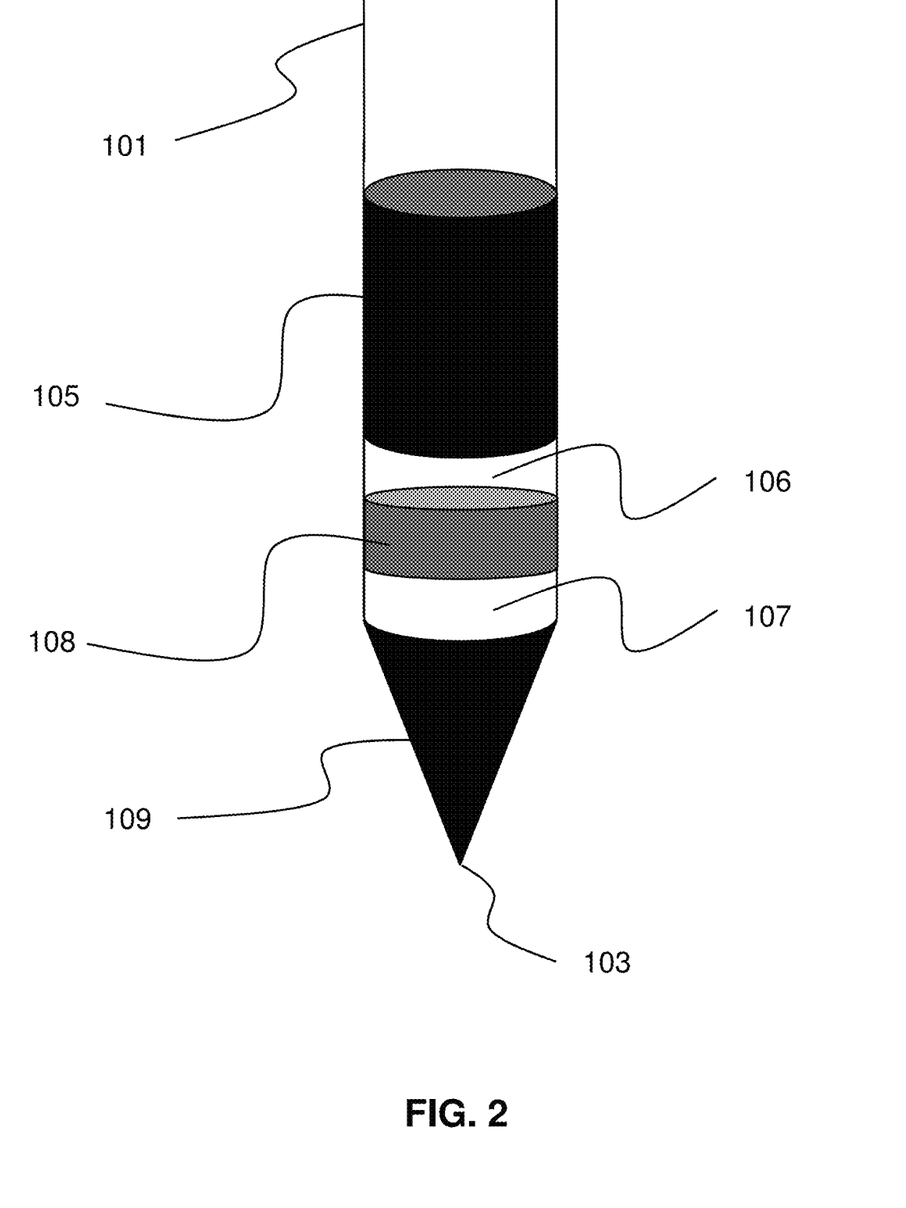
FIG. 2 shows pipette-tip storage with a buffer according to certain embodiments.

FIG. 2 shows a sample volume 105 and a buffer volume 108 being stored in a pipette tip 101 according to certain embodiments. The pipette tip 101 comprises an opening 103 through which fluid can be drawn into the pipette tip 101 in response to changes in pressure or volume within the pipette (not shown) in a manner similar to that described with respect to FIG. 1. However, an additional buffer volume 108 is draw in to the pipette tip 101 and is separated from the sample volume 105 and the sealing fluid 109 by two air gaps (106 and 107). The buffer volume 108 may be a solvent in certain embodiments and can have a similar composition to that of the sample volume 105 (e.g., similar pH and ion strength).

Figure 3:
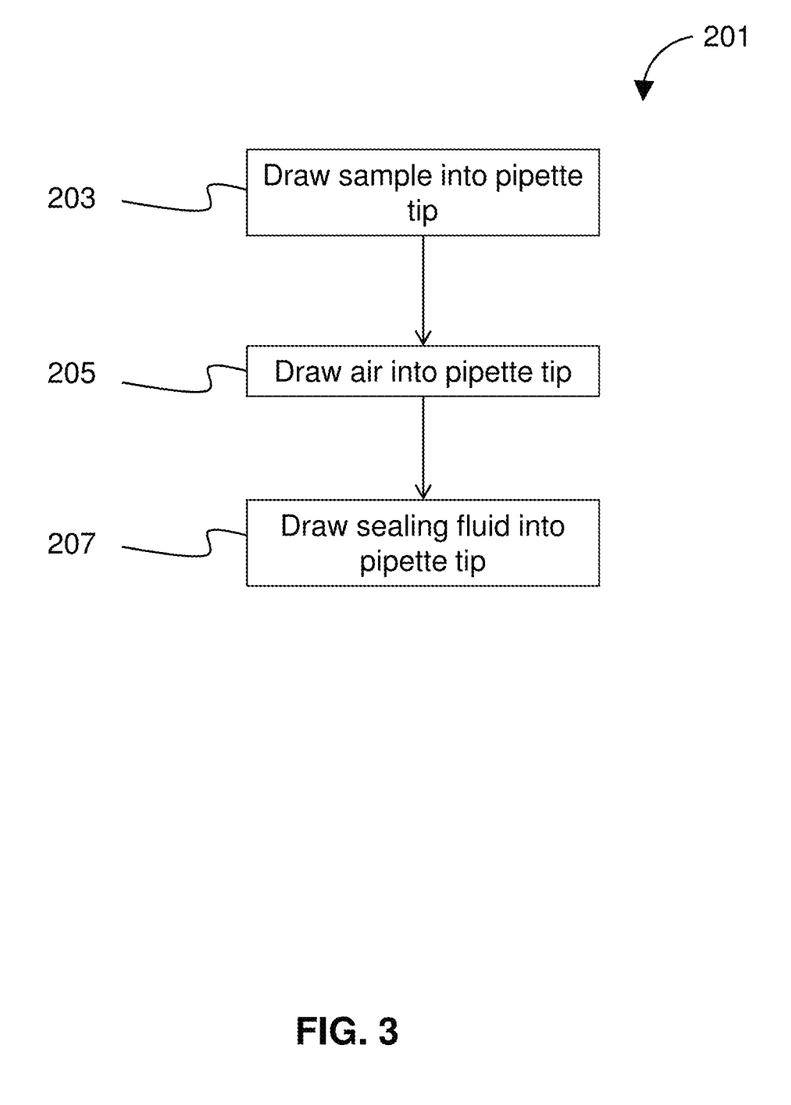
FIG. 3 diagrams steps of a method of the invention.

FIG. 3 diagrams steps of an exemplary method 201 of the invention. In order to initiate pipette-tip storage of a sample volume, the sample is first drawn into the pipette tip 203 through the tip's opening using the pipette. As noted, the pipette may be manually operated or may be part of an automated system. Subsequently, air is drawn into the pipette tip 205 to create an air gap between the sample and the opening of the pipette tip. The sealing fluid is then drawn into the pipette tip 207. In manually operated pipettes, a sufficient volume should be selected to accommodate the sample volume to be stored, the air gap, and the sealing fluid.

Figure 4:
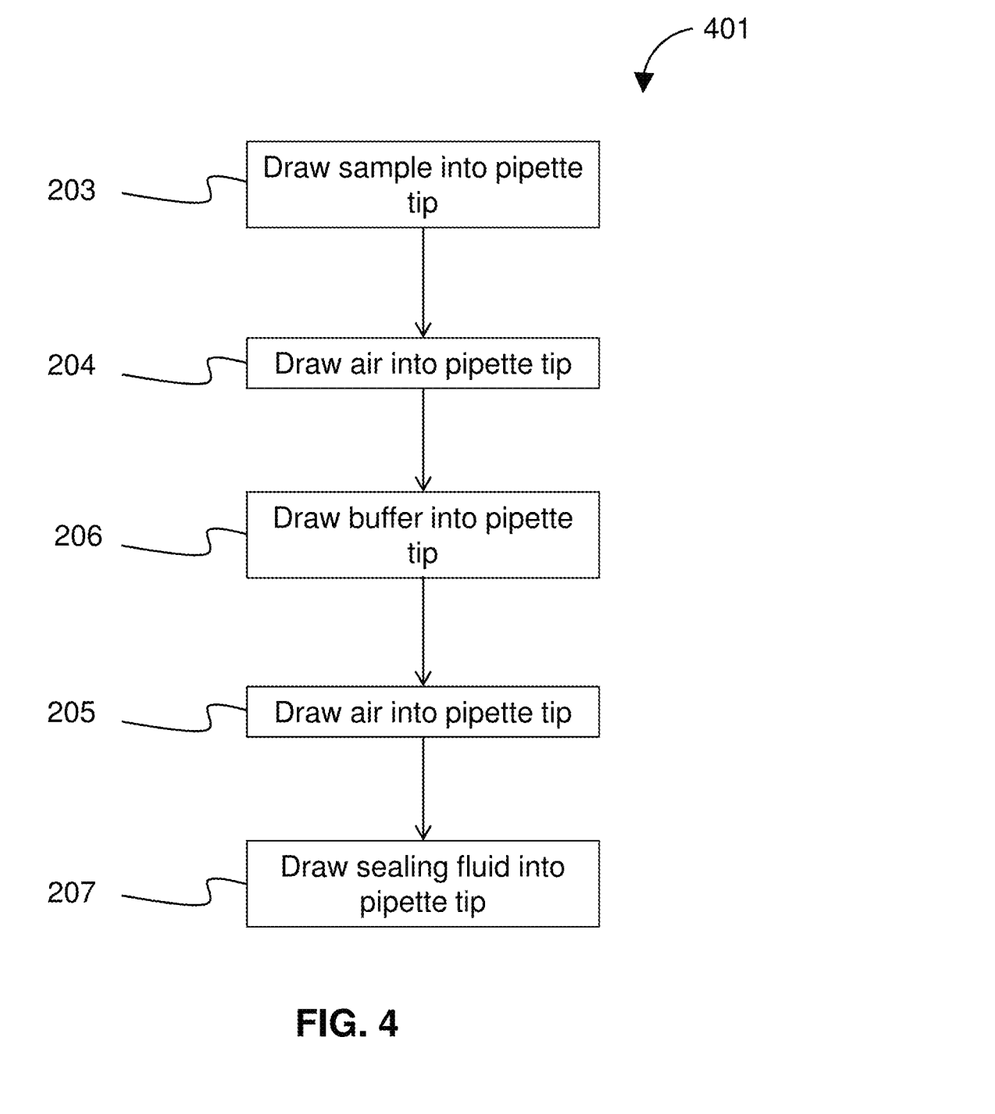
FIG. 4 diagrams steps of a method for sample storage with a buffer.

As shown in FIG. 4, in between drawing the sample into the pipette tip 203 and drawing air into the pipette tip 205, a buffer can be drawn in 206. An additional volume of air can be draw in 204 between the sample and the buffer to obtain a sample, air gap, buffer, air gap, sealing fluid arrangement as shown in FIG. 2.

Automated systems such as those available from Tecan Trading AG can use pipettes to automatically distribute precise volumes of sample and reagents between reservoirs and reaction vessels. Accordingly, such systems already include pipette tips and are operable to manipulate them for fluid handling purposes. Such systems are used to perform any variety of reactions including genomic applications and cell-based assays. In-pipette-tip storage may be programmed into any assay depending on the specific requirements of the reactions included therein. For example, during longer periods of incubation, pipette-tip storage as described herein may be used to avoid evaporation or sample degradation during incubation. Sample storage steps may be programmed into the automated system as a default last step upon completion of the assay or other reaction. Accordingly, if an automated reaction is completed over a weekend or after-hours, the reaction is safely stored until a user can retrieve the sample for analysis, long-term storage, or other subsequent processing.

Where the nature of the assay allows for it, automated systems may provide an option to pause the assay via a user interface such that a user can indicate a desire to pause the reaction and, upon reaching the next opportunity in the assay (e.g., where the reaction is not time-sensitive) the in-pipettetip storage methods described herein may be applied. In certain embodiments, the temperature of the samples stored in pipette tips may be manipulated via heaters or refrigerators within the automated system to aid in incubation or to promote stability of the sample being stored. Such systems may comprise enclosures in which the pipetting operations and, potentially, sample storage may be performed. In certain embodiments, systems may include means of disinfecting the interior of the enclosure to avoid sample contamination. For example, systems may be operable to release disinfecting gas into the enclosure and/or to generate a disinfecting gas such as ozone gas through a variety of known methods. Disinfection can be accomplished through any method including through the application of a disinfecting energy such as light (e.g. ultraviolet) or heat.

Systems and methods of the invention may be modified such that, instead of drawing a sealing fluid into the pipette tip, the opening of the pipette tip may be submerged in a reservoir of fluid to effectively seal the pipette tip and prevent evaporation of its contents. The reservoir may contain any of the fluids discussed above as potential sealing fluids including various mineral oils or even waxes. Sealing the pipette tip through submersion is also compatible with the use of air gaps and buffer fluid(s) as discussed above and such embodiments are contemplated.

In various embodiments, when retrieval of the sample volume is desired, the sealing fluid and sample may be released. During storage, an automated system may precisely manage and record the volumes of air and sealing fluid taken into the pipette tip and may then use that information to discard the exact amount of sealing fluid used into a waste receptacle before distributing the sample for further processing or analysis. The air gap may provide a buffer useful in evacuating the sealing fluid without accidentally discarding any of the sample volume.

In certain embodiments, the buffer and sealing fluid may be discarded in a single dispensing action. The buffer may serve to wash away traces of sealing fluid as it is dispensed from the tip to avoid potential contamination of the sample with sealing fluid.

Samples stored in pipette tips using the methods described herein may be stored without measurable evaporation for more than 1 hour, 2 hours, 6 hours, 12 hours, 24 hours, 2 days, 3 days, 4 days, or 5 days.

As one skilled in the art would recognize as necessary or best-suited for the systems and methods of the invention, systems and methods of the invention may include one or more servers and/or computing devices that may include one or more of processor (e.g., a central processing unit (CPU), a graphics processing unit (GPU), etc.), computer-readable storage device (e.g., main memory, static memory, etc.), or combinations thereof which communicate with each other via a bus. Computer systems may be integrated into or in communication with automated processing systems of the invention and may be operable to control one or more pipettes therein and perform the methods described above.

A processor may include any suitable processor known in the art, such as the processor sold under the trademark XEON E7 by Intel (Santa Clara, CA) or the processor sold under the trademark OPTERON 6200 by AMD (Sunnyvale, CA).

Memory preferably includes at least one tangible, non-transitory medium capable of storing: one or more sets of instructions executable to cause the system to perform functions described herein (e.g., software embodying any methodology or function found herein); data; or both. While the computer-readable storage device can in an exemplary embodiment be a single medium, the term "computer-readable storage device" should be taken to include a single medium or multiple media (e.g., a centralized or distributed database, and/or associated caches and servers) that store the instructions or data. The term "computer-readable storage device" shall accordingly be taken to include, without limit, solid-state memories (e.g., subscriber identity module (SIM) card, secure digital card (SD card), micro SD card, or solid-state drive (SSD)), optical and magnetic media, hard drives, disk drives, and any other tangible storage media.

Any suitable services can be used for storage such as, for example, Amazon Web Services, memory of server, cloud storage, another server, or other computer-readable storage. Cloud storage may refer to a data storage scheme wherein data is stored in logical pools and the physical storage may span across multiple servers and multiple locations. Storage may be owned and managed by a hosting company. Preferably, storage is used to store instructions as needed to perform and support operations described herein.

Input/output devices according to the invention may include one or more of a video display unit (e.g., a liquid crystal display (LCD) or a cathode ray tube (CRT) monitor), an alphanumeric input device (e.g., a keyboard), a cursor control device (e.g., a mouse or trackpad), a disk drive unit, a signal generation device (e.g., a speaker), a touchscreen, a button, an accelerometer, a microphone, a cellular radio frequency antenna, a network interface device, which can be, for example, a network interface card (NIC), Wi-Fi card, or cellular modem, or any combination thereof. Input/output devices such as user interfaces may be used to provide information regarding reaction status and to receive instructions including reaction holds that the computer may interpret as instructions to perform the on-pipette storage methods described herein.

One of skill in the art will recognize that any suitable development environment or programming language may be employed to allow the operability described herein for various systems and methods of the invention. For example, systems and methods herein can be implemented using Perl, Python, C++, C #, Java, JavaScript, Visual Basic, Ruby on Rails, Groovy and Grails, or any other suitable tool.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:
1. A sample storage method comprising:
   providing a sample in a pipette tip attached to a pipette;
   drawing air though an opening in the pipette tip using the pipette to create an air gap between the sample and the opening;

drawing a fluid into the opening using the pipette to seal the opening and prevent evaporation of the sample; and storing the sealed sample in the pipette tip for at least one hour and without environmental degradation.

2. The method of claim 1 wherein the fluid is immiscible with the sample.

3. The method of claim 2 wherein the sample is aqueous and the fluid is an oil.

4. The method of claim 3 wherein the fluid comprises mineral oil.

5. The method of claim 1 wherein the fluid does not evaporate at room temperature.

6. The method of claim 1 wherein the fluid is a solid at room temperature.

7. The method of claim 1 wherein the air gap separates the fluid from the sample.

8. The method of claim 1 further comprising storing the sample in the pipette tip without evaporation for at least one hour, at least 6 hours, at least 12 hours, at least 24 hours, at least 2 days, at least 3 days, at least 4 days, or at least 5 days.

9. The method of claim 1 wherein the pipette is part of an automated processing system.

10. The method of claim 9 wherein the automated processing system comprises a non-transitory memory in communication with a processor operable to perform steps of a reaction using the pipette.

11. The method of claim 10 wherein the automated processing system is operable to perform the drawing steps upon completion of the reaction.

12. The method of claim 10 wherein the automated processing system is operable to perform the drawing steps upon receipt of a user input pausing the reaction.

13. The method of claim 10 wherein the automated processing system is operable to dispense the sample upon receipt of a user input to dispense the stored sample.

14. The method of claim 1 further comprising:

storing the pipette tip with sealed opening in an enclosure; and disinfecting the enclosure.

15. The method of claim 14 wherein disinfecting is performed using a disinfecting gas.

16. The method of claim 15 wherein the disinfecting gas is an ozone gas.

17. The method of claim 14 wherein disinfecting is performed using a disinfecting energy source.

18. The method of claim 17 wherein the energy is ultraviolet light and wherein the pipette tip blocks ultraviolet light.

19. The method of claim 17 wherein the energy is thermal energy.

20. A sample storage method comprising:

providing a sample in a pipette tip attached to a pipette;

drawing air though an opening in the pipette tip using the pipette to create an air gap between the sample and the opening;

submerging the opening in a reservoir containing a fluid to seal the opening and prevent evaporation of the sample; and storing the sealed sample in the pipette tip for at least one hour and without environmental degradation.

* * * * *